April 5, 1960  YAO TZU LI ET AL  2,931,229
TRANSDUCER MOUNTINGS
Filed Dec. 17, 1956
Fig. 1 PRIOR CONSTRUCTION
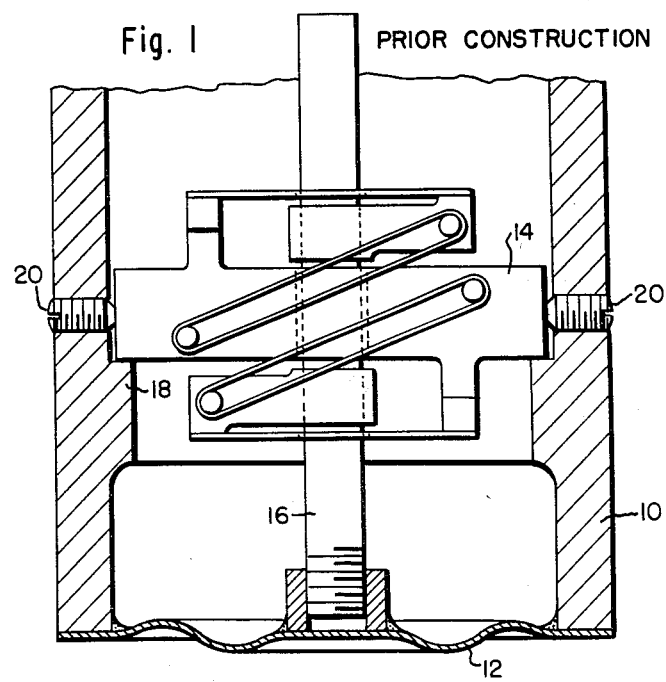
Fig. 3
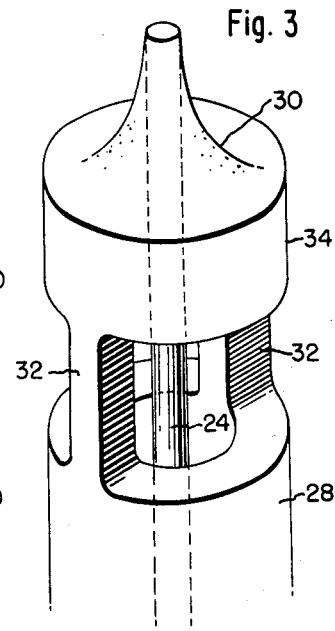
Fig. 2
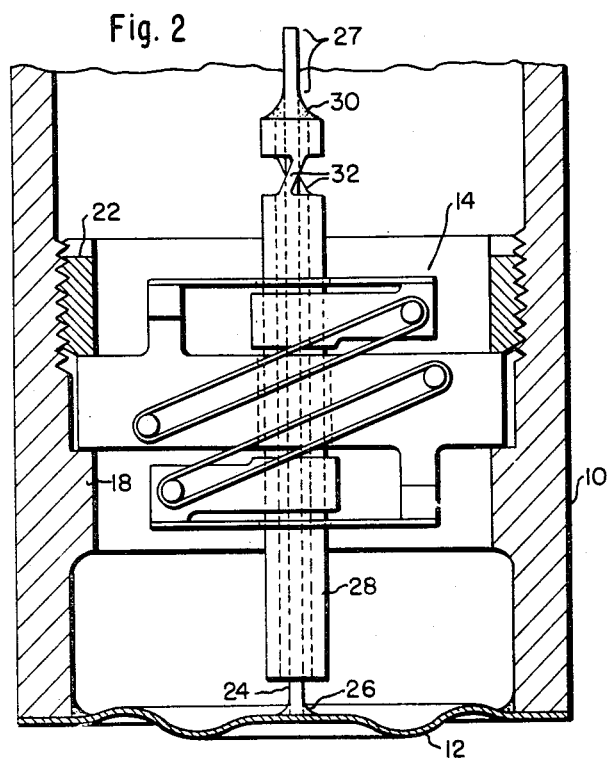
Fig. 4
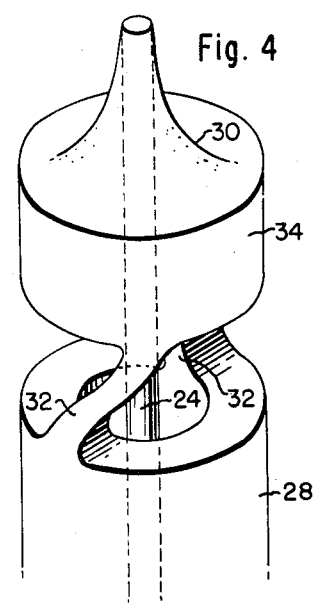
INVENTOR.
YAO TZU LI
SHIH-YING LEE
BY
KENWAY, JENNEY, WITTER & HILDRETH
ATTORNEYS United States Patent Office 2,931,229
Patented Apr. 5, 1960

2,931,229
TRANSDUCER MOUNTINGS

Yao Tzu Li and Shih-Ying Lee, Watertown, Mass.

Application December 17, 1956, Serial No. 628,711

1 Claim. (Cl. 73—398)

The present invention relates to transducer mountings and more particularly to mountings for strain gage transducers in pressure pick-up assemblies.

In our applications Serial Nos. 628,624, now abandoned, and 628,710 filed of even date herewith, we describe pressure pick-ups involving a diaphragm exposed to the space in which the pressure is to be measured. The diaphragm closes the end of a tubular or hollow cylindrical mounting member. Within the tubular mounting member is arranged a strain gage transducer which is connected to the diaphragm. Considerable difficulty has been experienced in accurately connecting the transducer to the diaphragm and also in making the initial or zero adjustment.

The object of the present invention is to provide a transducer mounting for a pressure pick-up according to which the device may be accurately mounted and a proper initial or zero adjustment may be made.

In the accompanying drawings

Fig. 1 is a sectional elevation illustrating the difficulties in existing types of mountings;

Fig. 2 is a sectional elevation of the preferred construction according to the present invention; and Figs. 3 and 4 are detail views on an enlarged scale.

Fig. 1 illustrates the difficulty usually encountered with the known forms of mountings. There is a tubular mounting member 10 the end of which is closed by a diaphragm 12, the bottom of the diaphragm being exposed to the space in which the pressure is to be measured. Within the mounting tube 10 is a transducer 14 which may be of any suitable form but is shown as being of the strain gage type illustrated in our copending application Serial No. 628,710. A spindle 16 is secured at one end to the diaphragm and is connected to the interior parts of the transducer, which need not be here described in detail. It is preferred to mount the transducer on a flange or ring 18; yet at the same time it is necessary that the connecting spindle 16 be of an exact length to connect the diaphragm and the transducer properly. Within the tolerances necessary it has been found very difficult to form the spindle 16 of the precisely proper length and to make the connection so that the diaphragm will be under the proper tension. An alternative is to do away with the flange ring 18 and mount the transducer unit in the tube 10 by means of set screws 20; however it has been found very difficult to obtain the proper adjustment and setting.

According to the present invention as shown in Figs. 2 to 4, the transducer body 14 is mounted permanently in the tubular mounting member 10 by means of a bottom flange 18 and a threaded retaining ring 22. The mounting is in approximately the correct position. The diaphragm 12 which encloses the end of the tube is provided with a thin rod or wire 24 which is suitably attached, as by silver solder 26, to the center of the diaphragm. The rod 24 extends upwardly through the hollow spindle 28 which takes the place of the spindle 16 of Fig. 1. The spindle 28 is connected to the transducer but not to the diaphragm. At the time of the initial assembly there is no connection between the transducer parts and the rod 24. Hence the wire 24 may be threaded through the spindle 28 and the diaphragm 12 may be spun, welded or otherwise secured in place to the tube 10. A free length of the rod indicated at 27 extends above the upper end of the spindle 28 which in turn extends above the transducer unit 14. Access is available to the top of the wire 24 and the spindle 28 through the interior of the tube 10 and hence a connection between the two parts may be readily made. This is preferably done by silver solder indicated at 30. Therefore it is only necessary to draw upwardly on the rod 24 until the diaphragm is tensioned to approximately its correct tension and then to apply the solder 30.

This operation as thus far described may not serve to give a precise zero setting for the unit. While the zero setting may be obtained by correct adjustment of the external bridge connections, it is preferred to have the strain gage under such initial tension as will give a correct initial or zero setting. To this end the hollow spindle 28 is formed at its upper end with parts milled away to leave a plurality of pillars or narrow webs 32, thus forming a weakened portion of the spindle. After the soldering operation the upper part 34 of the spindle may be conveniently twisted as indicated in Fig. 4, and thereby give a correct initial positioning of the wire 24. If desired, the bushing 34 may be turned initially to a half-way position so that it can be twisted in either direction in order either to lengthen or shorten the connection between the bushing and the diaphragm. Since the spindle 28 is made of stainless steel, the webs 32 take a permanent set and thereby hold the parts permanently in their adjusted position.

It will be understood that the strain wires of the transducer 14 are under some initial tension and the diaphragm will ordinarily be set in a slightly flexed position to act in tension on the wire 24, whereby the wire 24 is permanently under tension; in other words, the wire 24 is never called upon to transmit any compressive stresses from the diaphragm to the transducer. As a consequence, flexures of the diaphragm result in increases and decreases of the tension about the point of initial tension which is set by the positioning of the rod 24 with respect to the spindle 28 as previously described.

It will be understood that in an apparatus of this type the parts are relatively small. Although the drawings are necessarily on an enlarged scale for purposes of clarity, the webs or pillars 32 are usually of the order of 0.010 inch in width so that they constitute a delicate support for the assembly. This makes it simple to adjust the parts for the correct initial tension and assures that the initial setting will be permanently maintained.

Having thus described the invention, we claim:

A pressure pick-up assembly comprising a tubular supporting member, a diaphragm closing one end of the supporting member, a transducer fixed within the supporting member and having a movable part having a hollow spindle extending therethrough, said spindle being free of connection with the diaphragm, a rod secured to the diaphragm and passing through the spindle, and means for attaching the rod to the end of the spindle remote from the diaphragm, the spindle being formed near its said remote end with small pillars which can be twisted by turning the upper portion of the spindle.

References Cited in the file of this patent
UNITED STATES PATENTS

| 1,897,811 | Martin | Feb. 14, 1933 |
| 2,368,278 | Warshaw | Jan. 30, 1945 |
| 2,714,703 | Ruderfer | Aug. 2, 1955 |